May 21, 1968 C. HAWK 3,384,320
FISHING REEL
Filed Aug. 11, 1966 3 Sheets-Sheet 3
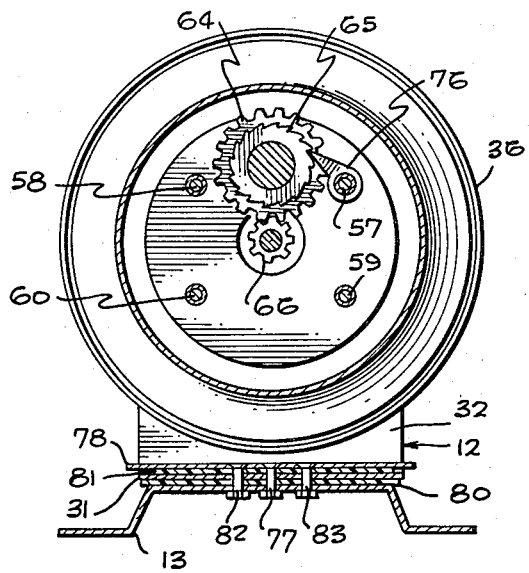
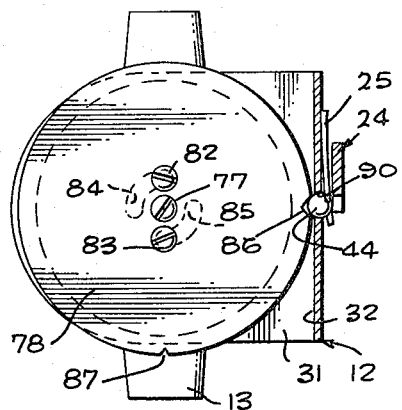
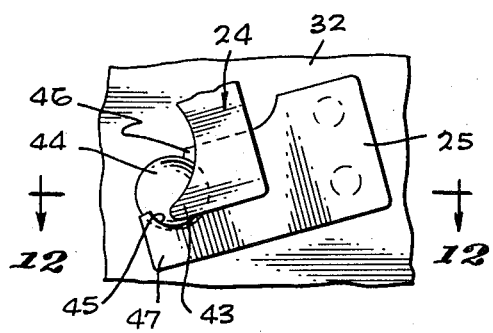
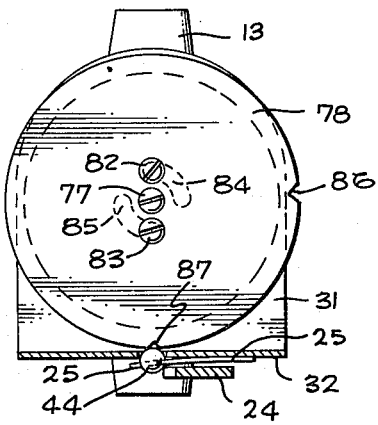
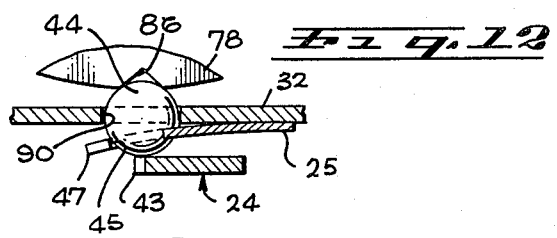
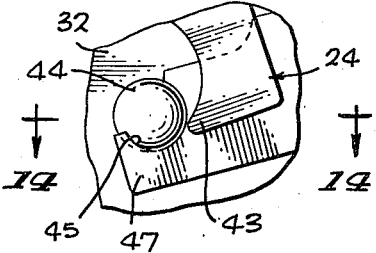
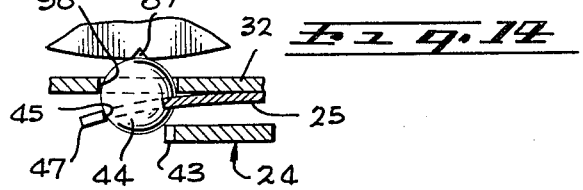
INVENTOR.
CORTEZ HAWK
BY Roger A. Marrs United States Patent Office 3,384,320
Patented May 21, 1968

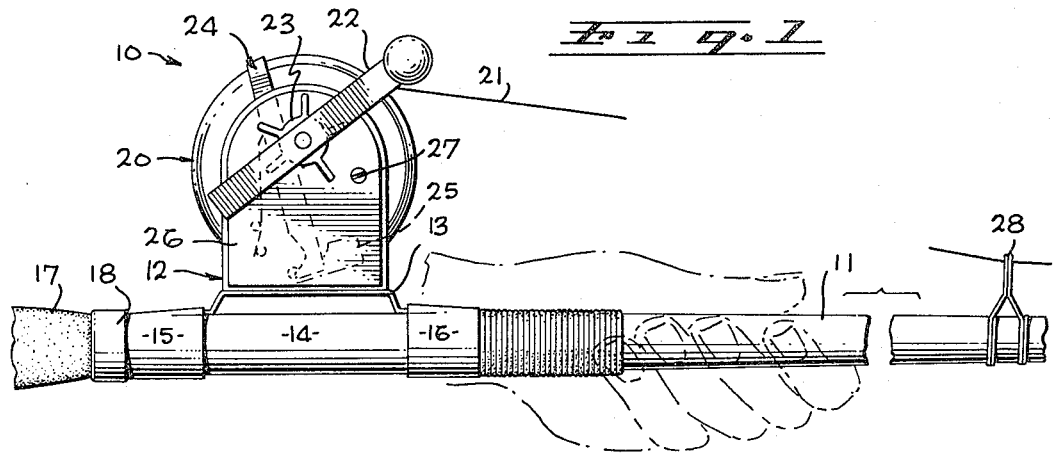
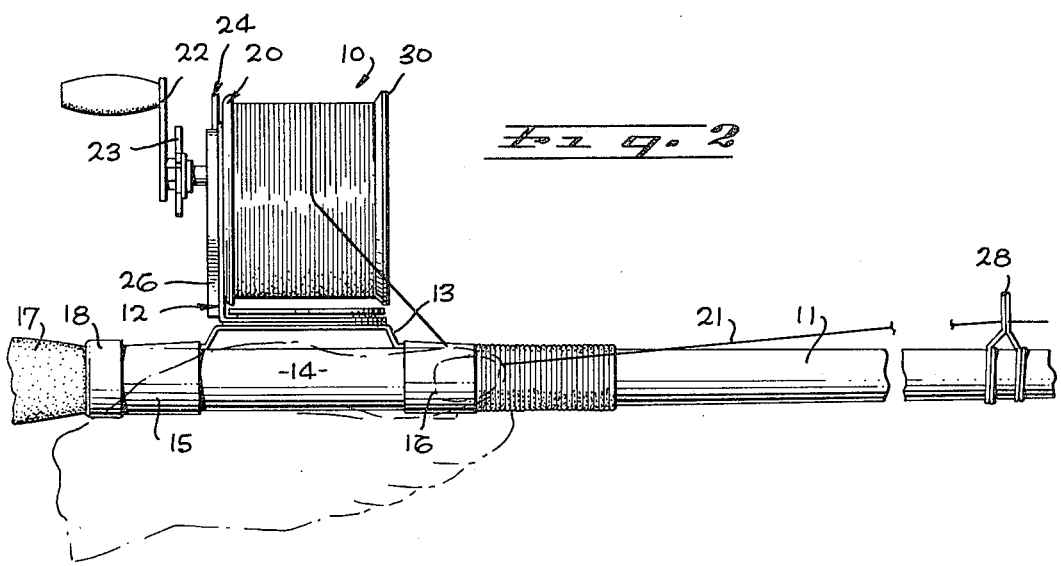
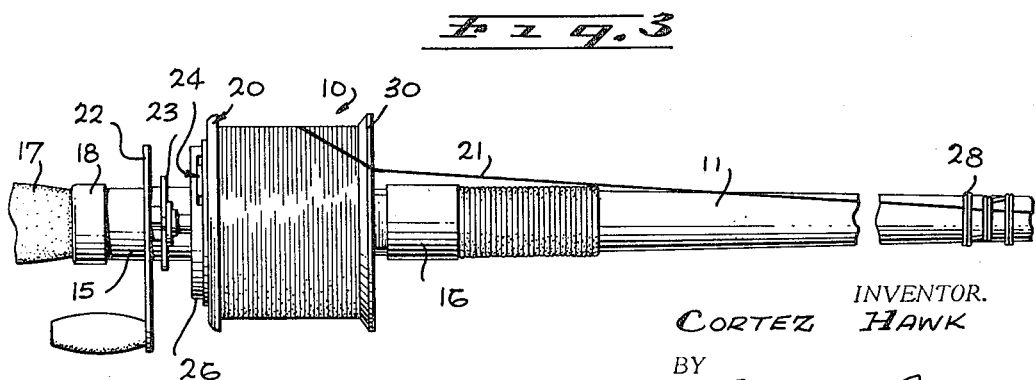
INVENTOR.
CORTEZ HAWK

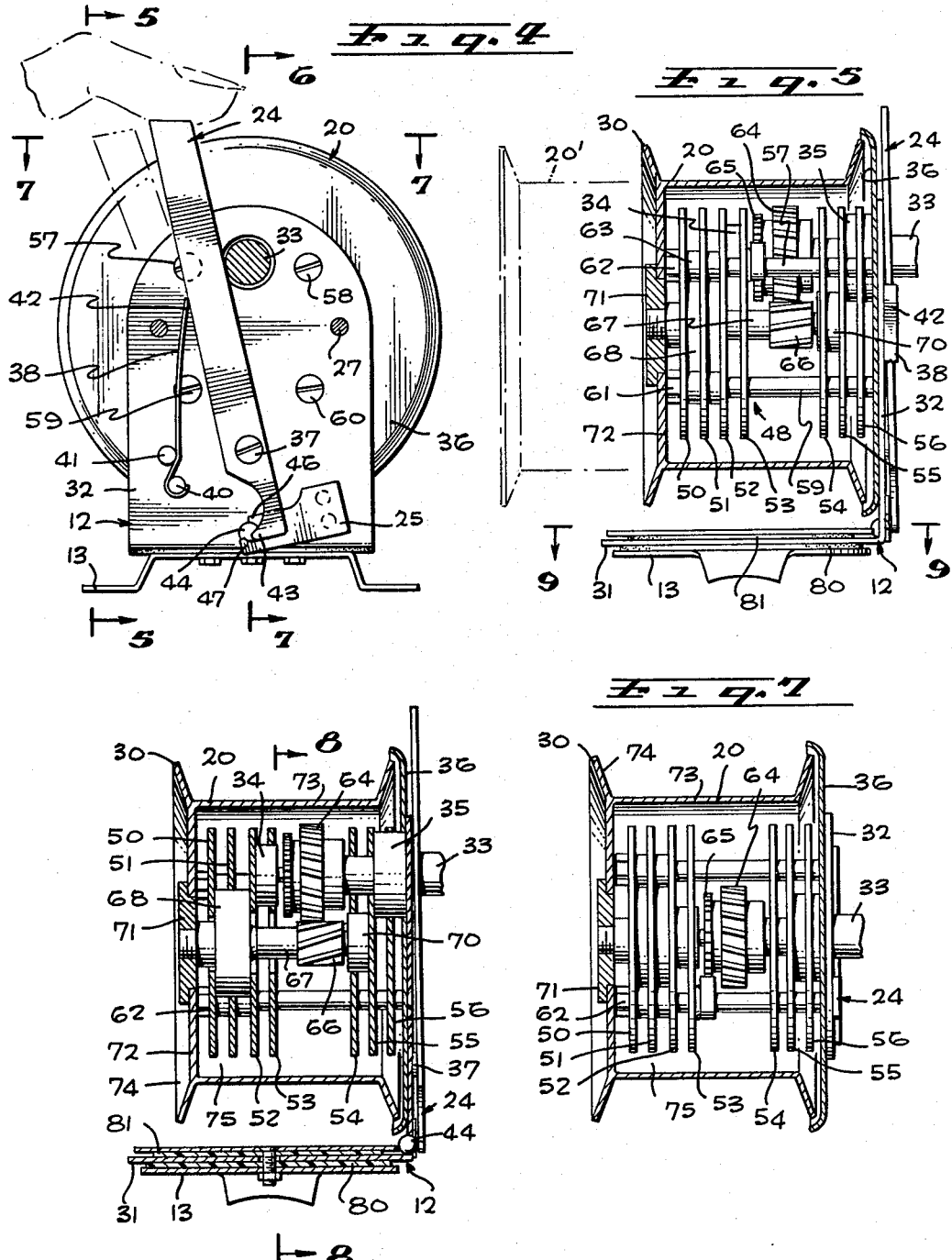

3,384,320
FISHING REEL
Cortez Hawk, Van Nuys, Calif., assignor to Panto Enterprises Incorporated, Sepulveda, Calif., a corporation of California
Filed Aug. 11, 1966, Ser. No. 571,923
9 Claims. (Cl. 242—84.2)

ABSTRACT OF THE DISCLOSURE

A fishing reel mounted on a rod to be selectively pivotable between a spin casting position with its axis parallel to the axis of the rod and a winding position traverse the rod with the reel being releasably retained in position by a spring biased, lever controlled ball and notch latch. The reel supporting plate includes a series of rods carrying discs which form a cage to support the spool and its drive mechanism.

---

This invention relates to fishing reels for use in sport fishing and more particularly to a novel overhead casting reel having releasable locking means for effecting conversion of the reel to either one of the winding type or to one of the spinning type and that incorporates means for readily accepting interchangeable fishing line carrying spools.

Although a variety of casting and spinning reels have been used for many years for the purpose of casting out fishing line and for effecting the retrieval thereof, certain difficulties attending the present methods of casting are recognized. Casting is generally achieved by swinging a fishing pole over the sportsman's head through a vertical or horizontal arc and allowing the weighted end of the line carrying a baited hook to be thrown outwardly as the line is paid out from a rotating spool on which the line is stored. The axis of the spool upon which the fishing line is wound generally extends transversely of the longitudinal dimension of the fishing pole. By employing a free-running spool, however, the initial force exerted upon the line after the pole has been swung about greatly accelerates the rotation of the spool. As the speed of the cast line passes its point of greatest velocity and begins to decelerate, the rapidly rotating spool exceeds the speed with which the line is being paid out therefrom. In this circumstance, the spool overruns the line and the latter is caused to be rewound upon the spool in a reverse direction until the excess line is taken up. At this point, the rotation of the spool is suddenly arrested and the outward cast of the line is stopped abruptly. The above-described phenomenon, commonly known as "back-lash," not only results in the inevitable loss of the fishing lure or bait but causes tangling of the line which requires substantial time to remedy. Furthermore, the effective distance to which a baited hook can be cast is greatly restricted.

To avoid back-lash and its aggravating result, fishing reels have been provided with drag means for braking the speed of the rotating spool during the casting of the fishing line. The frictional drag on the spool maintains a substantially constant pull on the line, thus preventing the reverse winding which characterizes back-lash. This method of correction is not without disadvantage, however, for the resistance of the spool to the rotation induced, not only by the provision of a drag or brake means but also by the inertia of the moving parts and the running friction thereof, limits the distance to which the line may be cast.

One attempt to avoid problems of back-lash resides in the development of a reel known as a "spinning" type which is characterized by positioning the rotating axis of the spool parallel with the longitudinal dimension of the fishing pole so that the line may be paid out during the cast over one end of the spool without the necessity of rotating the spool. In other words, the line slithers off the forward end of the spool in a spiral fashion and back-lash does not result because the line is removed from the spool in response only to the forward pull of the line. There is no perceptible resistance to the uncoiling action, and therefore, longer casts of the weighted end of the line are readily attained.

However, disadvantages have been encountered with reels constructed in the manner just described. The reels heretofore devised are mounted upon the fishing pole in such a manner that the axis of the spool is either fixed in a position parallel with the longitudinal axis of the pole, or it may be rotated to that position from the normal transverse arrangement and locked prior to casting. One disadvantage of the first mentioned construction lies in the awkward and unnatural manner in which the spool must be rotated when it is desired to reel in the line. Complex mechanisms are generally employed in such prior art devices for accomplishing such rewinding or line retrieval. Another disadvantage of both constructions resides in the fact that the line carrying spool is securely fastened to the reel in such a manner that it is extremely difficult and impractical to remove the spool from the reel in the event that it is desired to change the line stored thereon. In many instances, a fisherman may desire to change the line strength or weight ratio of the line and according to current practice, he must either fully unload the stored line on the spool and replace the previously stored line with the substitute line, or he may simply employ another reel having an already loaded spool with the desired line characteristics. The former method is cumbersome and time consuming while the latter method is duplicative and expensive.

Furthermore, conventional reels embody complex and expensive means for mounting the various rotating shafts incorporated into the reel mechanism. Because of the complexities, ball bearings and other types of low frictional bearing or journalled surfaces are not generally employed in fishing reels. Such bearings are extremely desirable since smoothness of cranking action during line retrieval is assured and greater control of the line during re-wind is gained.

Accordingly, the difficulties and problems encountered with conventional fishing line reeling devices are obviated by the present invention which provides for a turntable mounted spool having a central axis selectively adjusted to a line winding or retrieval position transversely oriented to the longitudinal axis of the fishing pole or to a line casting position parallel to the longitudinal axis of the pole so that the line may be paid off of one end thereof during casting. The turntable is rotatably carried on a fixture secured to the handle of the pole and is operatively coupled to a finger controlled locking means for releasably securing the spool in its line retrieval position and for effecting a slight holding or retaining pressure thereon when the spool is in its casting position. The reel includes brake or drag mechanisms as well as winding mechanisms that are cantilevered outwardly from the side of the fixture and that are enclosed by the spool. Portions of the mechanisms are supported on a plurality of spaced apart rigid discs that serve to hold low friction bearings of the ball bearing type. A hand crank for operating the winding mechanism is carried in driving relationship therewith by the fixture and projects outwardly from the side of the fixture opposite to its side from which the mechanism and spool projects.

By such a construction, the rotating shafts of the mechanisms can be readily mounted in the plurality of ball bearings held by a cage of rods secured by the discs so as to collectively form the axle for the spool and construction in this fashion permits the spool to be readily detached from the axle in the event that a fisherman desires to change or substitute spools having a variety of fishing lines stored thereon. Furthermore, the locking means can be operated by the finger of one hand as well as the rotation of the spool to either of its alternate positions. Because of this unique arrangement, it is unnecessary to rearrange the pole after casting so that the reel is downwardly depending therefrom for the winding procedure as is customarily practiced with the employment of conventional reels. At all times, the reel of the present invention is maintained in a position on top of the pole and the line extends from the spool through a plurality of upwardly extending eyelets.

Therefore, it is a primary object of the present invention to provide a novel fishing reel that may be readily converted to either one of the generally referred to as casting types or to one of the spinning types including means for fixedly locking the reel spool in the line retrieval position while merely exerting a holding pressure when the reel spool is in the casting position.

Another object of the present invention is to provide a novel fishing reel that may be converted from one position to the other with one hand, incorporating locking means for fixedly securing the spool in one of the two alternate positions.

Still another object of the present invention is to provide a novel fishing reel employing a unique locking mechanism so that the spool may be locked in place for either of two alternate orientations.

Yet another object of the present invention is to provide a novel fishing reel adapted to accept the interchangeability of substitute spools without necessitating the removal of the reel from the pole on which it is mounted or removal of other portions or parts of the reel.

Another object of the present invention is to provide a novel fishing reel that is designed for ease and economy of manufacture, and convenience of use and that while providing a practical, reliable, and durable fishing reel, additionally will be exceedingly effective for the purpose for which it is designed.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a side elevational view of the novel fishing reel of the present invention shown as being mounted on a fishing pole in a line retrieving position;

FIGURE 2 is a side elevational view of the fishing reel of FIGURE 1 showing the reel adjusted to the line casting position and illustrating the user's right hand temporarily holding the line preparatory to casting;

FIGURE 3 is a top plan view of the fishing reel shown in FIGURE 2 illustrating line play out during the casting procedure;

FIGURE 4 is an enlarged side elevational view of the fishing reel of FIGURE 1 having the cover therefor removed to illustrate the locking mechanism;

FIGURE 5 is a sectional view of the fishing reel as taken in the direction of arrows 5—5 of FIGURE 4 and illustrating the mounting discs for the mechanisms of the reel;

FIGURE 6 is a cross-sectional view of the fishing reel as taken in the direction of arrows 6—6 of FIGURE 5 and showing the location of various bearings for mounting of the shaft;

FIGURE 7 is a sectional view of the fishing reel shown in FIGURE 4 as taken in the direction of arrows 7—7 thereof;

FIGURE 8 is a cross-sectional view of the fishing reel of FIGURE 6 as taken in the direction of arrows 8—8 thereof;

FIGURE 9 is a sectional view of the revolving turntable incorporated into the reel as taken in the direction of arrows 9—9 of FIGURE 5 and showing the orientation thereof when in the line retrieval position;

FIGURE 10 is a view similar to that of FIGURE 9 illustrating the orientation of the turntable when in the line casting position;

FIGURE 11 is an enlarged fragmentary side elevational view of the locking means employed in the fishing reel showing the locking means engaged to prevent rotation of the turntable;

FIGURE 12 is a cross-sectional view of the locking means of FIGURE 11 as taken in the direction of arrows 11—11 thereof;

FIGURE 13 is a view similar to that of FIGURE 11 illustrating the locking means disengaged to allow rotation of the turntable; and FIGURE 14 is a cross-sectional view of the locking means as taken in the direction of arrows 14—14 of FIGURE 13.

Referring more particularly to the drawings and to the characters of reference marked thereon, the reel assembly of the present invention is indicated in the general direction of arrow 10 in FIGURE 1 and such assembly is illustrated as being secured to a fishing pole 11 by means of a fixture 12. The fixture 12, which will be hereinafter described in greater detail, is rotatably mounted on a longitudinal saddle plate 13 having end portions which engages on a reel seat 14 of the rod 11. The saddle plate 13 is removably secured to the reel seat by a sliding ring clamp 15 carried near a handle 17 of the pole and a fixed clamp 16. One end portion of the saddle plate 13 enters under the usual retaining clamp 16 while its opposite end is held under retaining clamp 15 that is held in place against axial movement by a nut 18 which is threaded to the pole adjacent handle 17.

In general, the reel 10 includes a rotatable spool 20 for storing a supply of fishing line 21, a hand crank 22 employed for use in winding or retrieval of the cast fishing line, a conventional star wheel adjustment 23 employed for drag torque control and a locking means including a lever 24 and a retainer plate 25. A cover 26 is used to enclose the locking means and is secured to the fixture 12 by means of screws 27. The fishing line 21 is processed through a plurality of eyelets, such as eyelet 28, that are suitably mounted along the length of the fishing pole and that are arranged in fixed spaced apart relationship.

As shown in FIGURE 1, the fishing reel 10 is illustrated in its line retrieval position whereby the sportsman may hold the pole 11 with his left hand so that his right hand may be in position to operate the reel crank 22 to effect rotation of spool 20 for winding line 21 thereon. In this position, the locking lever 24 is engaged to prevent rotation of the fixture 12.

In FIGURE 2, the fishing reel 10 is illustrated in its casting position whereby the axis of the spool is parallel with the longitudinal dimension of the fishing pole so that the line may be paid out during the cast over the cantilevered end of the spool as indicated by numeral 30 without the necessity of rotating the spool. The line 21 is maintained on the spool 20 by means of thumb pressure on the line wound upon the spool against the side of the pole 11. The line must be held during a portion of the pole swing during casting in order to permit the weighted end of the line to follow the radial path of the pole, thereby to gather momentum which carries the line outwardly when the thumb pressure is released. In this instance, the pole is being primarily supported by the sportsman's right hand and the thumb pressure urges the line 21 against the side of the pole 11.

FIGURE 3 illustrates the line 21 being drawn from storage on the spool 20 during a casting procedure in which the reel 10 operates as a spinning type. It is to be particularly noted that the line 21 slithers off the edge 30 from the cantilevered end of the spool 20. In the spinning position, the sportsman holds the pole in his right hand so that the direction and target location for the weighted end of the line can be precisely controlled.

Referring now to FIGURES 4 and 5, the fixture 12 is shown to comprise a base portion 31 having an upwardly extending support portion 32 on which is mounted a rotating shaft 33 connected on one end to the crank 22 on one side of the upright portion 32 and projecting outwardly from the other side of the upright portion 32 rotatably mounted in ball bearings 34 and 35, respectively. A plate 36 is fixed to the inside surface of the upright portion 32 of the fixture 12. The lever 24 of the locking means is pivotally secured to the outside of the upright portion 32 by means of a pivot 37 that is located at a position between the end of the lever and its mid-section so that the lever may be pivoted from the position as shown in solid lines which represents the full locking position to the position shown in broken lines which represents the unlocked position.

The lever 24 is biased into a locking position by means of leaf spring 38 that is secured at one end to pin 40 and that is tensioned against pin 41 so that the terminating end 42 of the leaf spring forcibly urges the lever 24 in a clockwise direction. However, pivoting of the lever in a clockwise direction is arrested by means of the releasable engagement of lever end 43 with a roller ball 44 that is captured in a recess 45 formed in the cantilevered end of retainer plate 25. The cantilevered end is bifurcated to provide split segments 46 and 47. The segments are composed of resilient material and are separated by the ball 44 so that the spring action of the segments holds the ball 44 within the notch 45. The plane of rotation in which the lever 24 travels passes through the ball 44 when the locking mechanism is in its locking condition so that the end 43 of the lever 24 is restricted from further rotation about its pivot 37 by the engagement therewith of ball 44.

Referring now more particularly to FIGURES 5, 6 and 7, the winding and drag mechanisms as well as the axle support for the spool 20 is provided by a cage arrangement indicated in the direction of arrow 48 that includes a plurality of parallel spaced apart discs 50–56 inclusive that are mounted on four substantially equally spaced apart rods 57–60 inclusive which may take the form of elongated screws. The screws are mounted on the upright portion 32 of fixture 12 as seen in FIGURE 4 and project outwardly from the opposite side thereof and terminate in threaded engagement with suitable end nuts such as indicated by numerals 60 and 61 for rods 57 and 59 respectively. The shanks of the screws are provided with a variety of spacers, such as spacer 63, so that the discs are suitably spaced apart. By employing the plurality of discs and the mounting screws and spacers, cage means are provided whereby a plurality of roller bearings such as the previously mentioned bearings 34 and 35 may be readily mounted to mechanically support the rotating shafts, such as shaft 33.

For example, bearing 34 is seated within a hole provided in disc 53, shown more clearly in FIGURE 6, and having one side thereof retained flush against the side surface of adjacent disc 52. Bearing 35 is mounted between disc 55 and the upright portion 32 of the fixture within holes provided in disc 56 and plate 36. The outer race of bearings 34 and 35 are retained within the holes provided in the respective discs and the plate by means of an interference type fit.

It is to be noted that a substantial distance is provided between the opposing surfaces of disc 53 and disc 54 so as to accommodate the presence of a gear 64 secured to the shaft 33 and its attendant ratchet gear 65. The cage arrangement 48 is fitted with a pinion 66 driven by the gear 64. The pinion is carried on a stub shaft 67 rotatably carried in ball bearings 68 and 70 supported on discs 51 and 54 respectively. It is to be particularly noted that the extreme end of shaft 67 terminates in a threaded connection 71 with a corresponding threaded bore that is integrally formed with a side member 72 forming a part of the spool 20. Basically, the spool takes the configuration of a cylinder having an annular side wall 73 upon which a quantity of fishing line may be loaded. The opposite ends of the annular body 73 include outwardly annular tapered flanges 74 and 75 with the extreme peripheral edge of the flange 74 constituting the payout edge 30 for the line during the casting procedure. The cylindrical body 73 defines an interior chamber 75 closed at one end by member 72 and open at its opposite end to receive the winding and drag mechanism or as previously described, the cage arrangement 48 on which the spool is mounted via threaded coupling 71. A feature of the coupling resides in the fact that the threads on the terminating end of stub shaft 67 are related to the threads on coupling 71 in such a manner that the threads include left hand turns so that the spool 20 will remain fixed to the shaft 67 during winding thereof by the crank 33.

In view of the foregoing, it can be seen that the spool 20 is mounted directly over the cage assembly 48 by means of the assembly being received into chamber 75 so that the threaded end of shaft 67 may be detachably coupled with the spool at the threaded coupling 71. Not only is the spool supported thereby but such an arrangement provides that the spool may be readily detached from the reel as indicated in broken lines in FIGURE 5 by the numeral 25. A feature of the present invention resides in the fact that a variety of spools are interchangeable with the reel 10 so that a sportsman may selectively change spools which may carry different fishing line having certain desired characteristics. The spools may be changed by merely unthreading spool 20 from its attachment to shaft 67 and sliding the spool laterally over the cage assembly. Once the spool has been removed, another spool may be inserted over the cage assembly 48 and threadably coupled thereto. The removable feature of the present invention in no way affects the locking means or the winding or drag mechanisms which remain intact during the interchanging or substitution of fishing line spools.

Referring now in detail to FIGURE 8, a rachet tooth 76 is employed in conjunction with rachet gear 65 so as to ensure that rotation of shaft 33 will be only in the winding direction which in the present instance is counterclockwise. Furthermore, it can be seen that drive gear 64 is in mesh with the pinion 66. It is also to be noted that fixture 12 takes the form of a turntable wherein base portion 31 is rotatably mounted on saddle plate 13 about fastener 77. A stationary plate 78 is provided which is a part of the locking means that is held to the saddle plate 13 by the fastener 77. Disposed between the saddle plate 13 and portion 31 is a shim, spacer or washer 80. Interposed between the upper surface of fixture portion 31 and the stationary plate 78 is a second shim or spacer 81. Spacers 80 and 81 may be composed of any suitable material to reduce friction during rotation of the fixture; however, it is preferred that the washers be composed of a suitable plastic-like material having low frictional surface characteristics.

In order to effect a smooth rotation of the fixture 12 and to assure stable mounting of the fixture onto the saddle plate 13, a pair of guide posts 82 and 83 are provided which are in alignment with the fastener 77 and further serve to hold the fixture, washers and saddle plate together. However, as noted in FIGURES 9 and 10, the base portion 31 of fixture 12 is formed with a pair of arcuate slots 84 and 85 through which the shank portions of the posts 82 and 83 pass so that, in effect, the slots function as a guide for rotation of the fixture 12. The amount of rotation of the fixture is determined by the engagement of the shank portion of the respective posts with the terminating ends of the respective slots. For example, FIGURE 9 illustrates the post engaging the respective ends of slots 84 and 85 when the fixture is in its locked position such as for line retrieval. In FIGURE 10, the posts 82 and 83 are engaged with the opposite terminating ends of the slots 84 and 85 when the fixture is in its reel spinning position. It is to be particularly noted that stationary plate 78 and saddle plate 13 are fixed in position and that no degree of rotation is permitted.

Furthermore, it is to be noted in these latter figures that the stationary plate includes a pair of notches 86 and 87 that are located approximately 90° apart and that are formed in the edge marginal periphery of the plate 78. Notch 86 is cut into the edge of the plate to a greater depth than the cut of notch 87. The notches are intended to be releasably engaged by the detent on ball 44 that is seated in an aperture 90 formed at the foot of the upright portion 32 of the fixture 12 adjacent the terminating end 43 of the lever 24. As previously noted, the ball 44 seats within the notch 45 formed in the retainer segment 47 on one side of the ball and having segment 46 slightly projecting in a direction behind the ball. The terminating end 46 of the lever 24, as illustrated in FIGURE 9, forcibly urges the ball 44 into the notch 86 for locking the fixture in the line retrieval position. As illustrated in FIGURE 10, the ball is engaged with the notch 87; however, since the notch 87 is of shallow depth, the end 43 of the lever will not travel past the detent or ball so that the turntable fixture 12 will be held in this position but not locked.

Referring now more particularly to FIGURES 11 and 12, the locking mechanism is illustrated in its locked position so that the turntable fixture 12 maintains the spool in the position shown in FIGURES 1 and 9. The ball detent 44 is pressed against and into the notch 86 by means of the foot or terminating end 43 of the lever 24. The terminating end 43 couples with the ball 44 in a type of interference fit so that a continuous load bearing path is provided from the stationary plate 78 to the upward support portion 32 of the fixture 12 via the ball 44. In FIGURES 13 and 14, the locking mechanism is illustrated in its unlatched condition as illustrated in FIGURES 2 and 10 whereby the ball 44 is spring biased in aperture 90 by the resilient action of the retainer segment 47 so that the ball is urged into the notch 87. The ball is not locked in this position since the lever arm is not engaged in the interference type fit therewith. However, the extreme tip of the terminating end 43 is in close proximity to the ball so that the ball will not fall out of its seat within the aperture 90 or the recess 45 in the segment 47.

Therefore, it can be seen that the fishing reel of the present invention provides a novel fishing line reel that may be adapted to be positioned to either one of two alternate positions depending on the type of fishing procedure desired. In the line retrieval position, the locking means effectively secures the spool to the pole so that its rotating axis is transverse to the major dimension of the fishing pole. The locking means lever arm 24 is urged about its pivot 37 by leaf spring 38 so that its terminating end 43 engages ball detent 44 in an interference fit whereby the ball 44 is seated within the notch 86 of the stationary plate 78.

When it is desired to change the position from that shown in FIGURE 1 to the position shown in FIGURES 2 and 3, the lever 24 is rotated counterclockwise against the tension of spring 38 which permits the ball 44 to move outwardly against the spring bias of the segment 47 and ride along the edge of plate 78. As the ball 44 travels along the edge of plate 78, it will soon be forced into notch 87 by the biasing of the segment 47 but will not be locked in this position since a substantial portion of the ball 44 will project outwardly from the exterior surface of upright portion 32 to interfere with the clockwise travel of the terminating end 43 of the lever 24. Such interference will restrict the rotary movement of the lever and the fixture 12 including the spool 20 will be retained in the position shown in FIGURES 2 and 3 but will not be locked therein. Therefore, during the fishing operation, the sportsman can quickly convert the spool from the spinning position into the line retrieval position without having to unlock the turntable mechanism and yet when the spool is in the line retrieval position, it will be locked to the pole so that the use thereof may be employed as in conventional fishing procedures.

While particular embodiments of the present invention have been shown and described, it will be obvious to those skilled in the art that changes and modifications may be made without departing from this invention in its broader aspects, and therefore, the aim in the appended claims is to cover all such changes and modifications as fall within the true spirit and scope of this invention.

I claim:

1. In a convertible casting and spinning reel, the combination comprising:
   a stationary means attachable to a fishing pole;
   turntable means pivotally mounted on said stationary means;
   spool means;
   means detachably and rotatably supporting said spool means in a manner wherein said turntable means is movable to a spinning position and to a line retrieval position;
   releasable detent means carried on said turnable means operably coupled to said stationary means for releasably locking said turntable means in its line retrieval position and for retaining said turnable means in its spinning position;
   one notch of said pair being formed to a deeper depth and opening thereto than the formed depth and opening thereto of the other notch of said pair and wherein said one notch is releasably engaged by said detent means when said spool means is in its line retrieval position.

2. The invention as defined in claim 1 wherein
   said detent means includes a ball carried on said turntable means; and
   biasing means for urging said ball against said peripheral edge of said plate.

3. The invention as defined in claim 2 wherein said detent means further includes a manually operable lever pivotally mounted on said turntable means and having a terminating end thereof adapted to engage said ball so as to maintain said ball in locking engagement with said one notch of deeper depth to prevent relative rotary movement between said turntable means and said stationary plate.

4. The invention as defined in claim 3 wherein said detent means further includes a tensioned leaf spring carried on said turntable means for urging said lever in a clockwise direction to engage said lever terminating end with said ball.

5. The invention as defined in claim 4 wherein said turntable means includes an upright support from one side of which said spool means is rotatably projected.

6. The invention as defined in claim 5 including
   a plurality of discs arranged in fixed spaced apart relation with respect to each other;
   rod means mounting said discs to said upright support;
   drive means operably coupling said spool to upright support for effecting rotation of said spool means; and
   ball bearing means mounted on said discs for rotatably supporting said drive means.

7. The invention as defined in claim 6 including threading coupling means for detachably connecting said spool means to said drive means and being adapted to readily accept the substitution or interchange of said spool means for other spool means.

8. In a convertible casting and spinning reel, the combination comprising:
   a stationary plate attachable to a fishing pole;
   a turntable fixture having a base portion pivotally mounted on said plate to rotate in a horizontal plane and an upright support portion arranged normal to said base portion;

a cage assembly fixed to said upright portion and arranged to cantilever laterally therefrom in fixed spaced relationship with respect to said base portion;

shaft means rotatably carried by said cage assembly and having an end section terminating beyond the cantilevered end of said cage assembly;

a reel spool substantially enclosing said cage assembly and being detachably coupled to said shaft means end portion;

means for releasably locking said fixture to said stationary plate in a position whereby the rotating axis of said spool lies transversely with respect to the major axis of the fishing pole;

said locking means includes a notch formed in the peripheral edge of said stationary plate in close proximity to said upright portion;

a ball detent movably carried on said upright portion;

biasing means mounted on said upright portion urging said ball detent to ride against said peripheral edge; and a resiliently biased lever pivotally mounted on said upright portion and being adapted to selectively engage with ball detent to hold said ball detent within said notch to lock said stationary plate to said turntable means to restrict rotary movement therebetween.

9. The invention as defined in claim 8 wherein said cage assembly includes a plurality of discs arranged in fixed spaced relationship with respect to each other; and ball bearing means secured to selected ones of said discs for rotatably supporting said shaft means.

References Cited

UNITED STATES PATENTS

| 1,114,084 | 10/1914 | Wells | 242—84.2 |
| 2,581,306 | 1/1952 | Slotterback | 242—84.2 |
| 2,613,046 | 10/1952 | Redding | 242—84.2 |
| 2,614,767 | 10/1952 | Dean | 242—84.2 |
| 2,672,301 | 3/1954 | Shelburne | 242—84.2 |

FOREIGN PATENTS

| 1,201,748 | 7/1959 | France. |
| 90,356 | 11/1957 | Norway. |

BILLY S. TAYLOR, *Primary Examiner.*

UNITED STATES PATENT OFFICE
CERTIFICATE OF CORRECTION

Patent No. 3,384,320                        May 21, 1968

Cortez Hawk

It is certified that error appears in the above identified patent and that said Letters Patent are hereby corrected as shown below:

Column 8, line 16, after "fishing pole" insert -- and including a plate having a pair of notches formed in the peripheral edge thereof approximately 90° apart --.

Signed and sealed this 28th day of October 1969.

(SEAL)
Attest:

Edward M. Fletcher, Jr.                   WILLIAM E. SCHUYLER, JR.

Attesting Officer                             Commissioner of Patents